United States Patent
Yoshida

(10) Patent No.: US 12,272,125 B2
(45) Date of Patent: Apr. 8, 2025

(54) LEARNING DEVICE, FACIAL RECOGNITION SYSTEM, LEARNING METHOD, AND RECORDING MEDIUM

(71) Applicant: NEC Corporation, Tokyo (JP)

(72) Inventor: Kosuke Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 361 days.

(21) Appl. No.: 17/791,742

(22) PCT Filed: Jan. 14, 2020

(86) PCT No.: PCT/JP2020/000911
§ 371 (c)(1),
(2) Date: Jul. 8, 2022

(87) PCT Pub. No.: WO2021/144857
PCT Pub. Date: Jul. 22, 2021

(65) Prior Publication Data
US 2023/0029988 A1    Feb. 2, 2023

(51) Int. Cl.
*G06V 10/776*    (2022.01)
*G06V 10/774*    (2022.01)
*G06V 40/16*    (2022.01)

(52) U.S. Cl.
CPC ........ *G06V 10/776* (2022.01); *G06V 10/7747* (2022.01); *G06V 40/172* (2022.01)

(58) Field of Classification Search
CPC ............. G06V 10/776; G06V 10/7747; G06V 40/172; G06V 10/761; G06V 10/774; G06V 10/82; G06N 20/00; G06T 7/00
See application file for complete search history.

(56) References Cited

U.S. PATENT DOCUMENTS

| | | | |
|---|---|---|---|
| 9,767,349 B1 * | 9/2017 | Shreve | G06V 40/174 |
| 2019/0258925 A1 | 8/2019 | Li et al. | |
| 2020/0184341 A1 | 8/2020 | Ide et al. | |
| 2020/0300970 A1 * | 9/2020 | Nguyen | G01S 13/88 |

FOREIGN PATENT DOCUMENTS

| | | | |
|---|---|---|---|
| CN | 107247940 A | | 10/2017 |
| CN | 110235083 A | * | 9/2019 |
| CN | 108133238 B | * | 5/2020 |
| WO | 2019/035364 A1 | | 2/2019 |

OTHER PUBLICATIONS

Sankaranarayanan, Swami et al., "Triplet Similarity Embedding for Face Verification", arXiv:1602.03418v2 [cs.CV] Mar. 13, 2016, 6 pages.*
Ming, Zuheng et al., "Simple Triplet Loss Based on Intra/Inter-class Metric Learning for Face Verification", 2017 IEEE International Conference on Computer Vision Workshops, pp. 1656-1664.*
Japanese Office Action for JP Application No. 2021-571088 mailed on Feb. 14, 2023 with English Translation.
International Search Report for PCT Application No. PCT/JP2020/000911, mailed on Apr. 14, 2020.

* cited by examiner

*Primary Examiner* — Samir A Ahmed

(57) ABSTRACT

A learning device performs learning a facial recognition model so as to further reduce a triplet loss that uses a first facial image, a second facial image that is a candidate for an adversarial example of a same person as the first facial image, and a third facial image that is a candidate for an adversarial example of a different person than the first facial image.

6 Claims, 3 Drawing Sheets

LEARNING DEVICE, FACIAL RECOGNITION SYSTEM, LEARNING METHOD, AND RECORDING MEDIUM

This application is a National Stage Entry of PCT/JP2020/000911 filed on Jan. 14, 2020, the contents of all of which are incorporated herein by reference, in their entirety.

TECHNICAL FIELD

The present invention relates to a learning device, a facial recognition system, a learning method and a recording medium.

BACKGROUND ART

Several techniques have been proposed in relation to learning of neural networks. For example, Patent Document 1 describes a learner that performs learning of a neural network using a loss function called triplet loss.

PRIOR ART DOCUMENTS

Non-Patent Documents

[Patent Document 1] PCT International Publication No. WO 2019/035364

SUMMARY OF THE INVENTION

Problem to be Solved by the Invention

Neural networks such as deep learning are known to be prone to erroneous recognition of inputs called adversarial examples. When learning a neural network used for facial recognition, it is preferable that the learning be performed in consideration of the case where an adversarial example is input to the facial recognition device in order to reduce the error of the recognition result for the adversarial example.

An example object of the present invention is to provide a learning device, a facial recognition system, a learning method and a recording medium capable of solving the aforementioned problem.

Means for Solving the Problem

According to the first example aspect of the present invention, a learning device includes: a learning means that performs learning a facial recognition model so as to further reduce a triplet loss that uses a first facial image, a second facial image that is a candidate for an adversarial example of a same person as the first facial image, and a third facial image that is a candidate for an adversarial example of a different person than the first facial image.

According to the second example aspect of the present invention, a facial recognition system includes: a learning device and a facial recognition device, the learning device includes a learning means that performs learning of a facial recognition model so as to further reduce a triplet loss that uses a first facial image, a second facial image that is a candidate for an adversarial example of a same person as the first facial image, and a third facial image that is a candidate for an adversarial example of a different person than the first facial image, and the facial recognition device performs facial recognition using the facial recognition model obtained in the learning.

According to the third example aspect of the present invention, a learning method includes: a step of performing learning of a facial recognition model so as to further reduce a triplet loss that uses a first facial image, a second facial image that is a candidate for an adversarial example of a same person as the first facial image, and a third facial image that is a candidate for an adversarial example of a different person than the first facial image.

According to the fourth example aspect of the present invention, a recording medium that records a program for causing a computer to execute: a step of performing learning of a facial recognition model so as to further reduce a triplet loss that uses a first facial image, a second facial image that is a candidate for an adversarial example of a same person as the first facial image, and a third facial image that is a candidate for an adversarial example of a different person than the first facial image.

Effect of the Invention

According to the above-mentioned learning device, facial recognition system, learning method and recording medium, learning can be performed in consideration of the case where an adversarial example is input to a facial recognition device.

EXAMPLE EMBODIMENTS

Hereinbelow, example embodiments of the present invention will be described, but the following example embodiments do not limit the invention according to the claims. Also, combinations of features described in the example embodiments may not be essential to the means of solving the invention.

Figure 1:
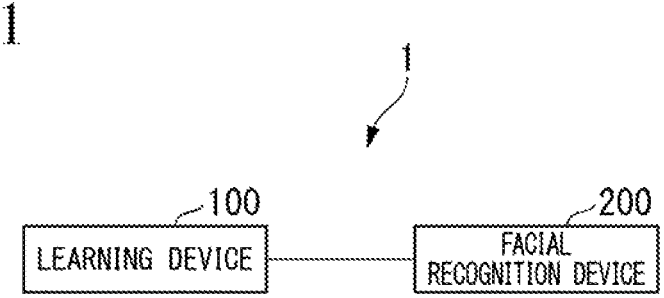
FIG. 1 is a schematic configuration diagram showing an example of a device configuration of a facial recognition system according to an example embodiment.

FIG. 1 is a schematic configuration diagram showing an example of the device configuration of the facial recognition system according to an example embodiment. With the configuration shown in FIG. 1, a facial recognition system 1 includes a learning device 100 and a facial recognition device 200.

The facial recognition system 1 is a system that performs facial recognition.

The learning device 100 acquires a facial recognition model for facial recognition by learning. The facial recognition model referred to here is a model that receives input of a facial image to be recognized and outputs a feature vector of the input facial image. Learning referred to here is machine learning.

In the following, a case where the learning device 100 uses a deep learning model as a facial recognition model will be described as an example. However, the facial recognition model used by the learning device 100 is not limited to a specific type of model, and can be various artificial intelligence models in which an adversarial example in facial recognition can occur.

An adversarial example in facial recognition referred to here is an image that is a post-processing image obtained by processing the original facial image and while to the human eye it resembles the facial image of the same person as the original facial image, it is treated in facial recognition by a facial recognition device as a facial image of a person different from the person in the original facial image.

The difference obtained by subtracting the original image from the post-processing image is also called perturbation or noise. The calculation of the difference between the two images is performed by calculating the difference between the pixel values for each corresponding pixel of the two images (pixels at the same position in the images). The process of generating an adversarial example from the original image is also referred to as adding noise to the original image.

Adversarial examples in facial recognition include adversarial examples for recognition avoidance and adversarial examples for spoofing. The recognition avoidance adversarial example is an adversarial example for avoiding being recognized as the person in the original facial image. The spoofing adversarial example is an adversarial example for being recognized as a person different from the person in the original facial image.

The facial recognition device 200 performs facial recognition using a facial recognition model obtained by learning by the learning device 100. Specifically, the facial recognition device 200 inputs a facial image of the person to be recognized into the facial recognition model as image data and acquires a feature vector. Then, the facial recognition device 200 outputs a recognition result by comparing the obtained feature vector with the feature vector of the facial image of a person registered in advance as a candidate for facial recognition.

For example, the facial recognition device 200 may calculate the distance between the feature vector of the facial image of the person to be recognized and each of the feature vectors of the facial images of a plurality of candidates. Then, when there is a candidate in which the distance is equal to or less than a predetermined determination threshold value, the facial recognition device 200 may output a recognition result indicating that the person to be recognized and the candidate having the minimum distance are the same person. On the other hand, when the distance is larger than the determination threshold value for any of the candidates, the facial recognition device 200 may show a recognition result indicating that the person to be recognized is different from any of the candidates.

The learning device 100 and the facial recognition device 200 may be configured as separate devices or may be configured as one device.

Figure 2:
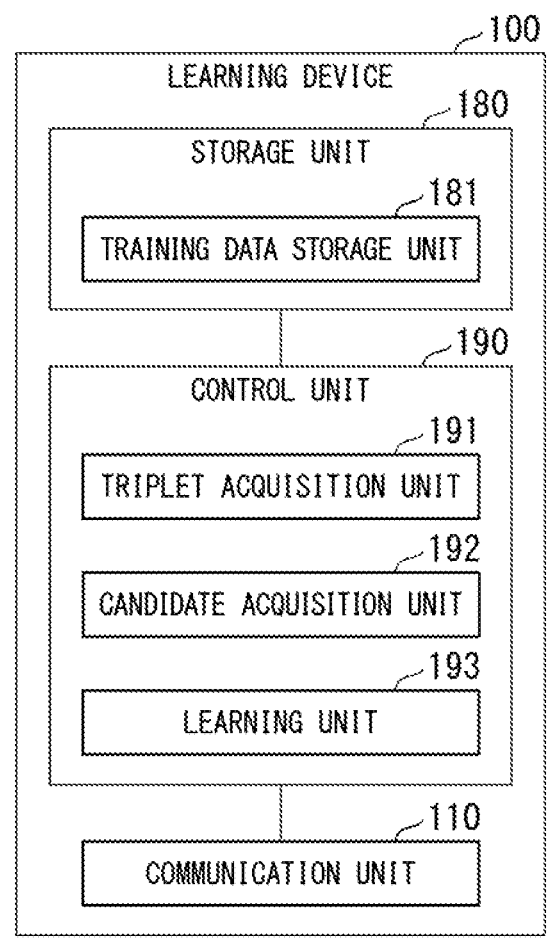
FIG. 2 is a schematic block diagram showing an example of a functional configuration of a learning device according to the example embodiment.

FIG. 2 is a schematic block diagram showing an example of the functional configuration of the learning device 100. With the configuration shown in FIG. 2, the learning device 100 includes a communication unit 110, a storage unit 180, and a control unit 190. The storage unit 180 includes a training data storage unit 181. The control unit 190 includes a triplet acquisition unit 191, a candidate acquisition unit 192, and a learning unit 193.

The communication unit 110 communicates with other devices. For example, the communication unit 110 transmits the facial recognition model obtained by learning of the learning device 100 to the facial recognition device 200.

The storage unit 180 stores various data. The storage unit 180 is configured by using the storage device included in the learning device 100.

The training data storage unit 181 stores a facial image for use in learning as image data. Specifically, the training data storage unit 181 stores a facial image on which adversarial example processing has not been performed in association with the identification information of the person in that facial image. For one or more persons, the training data storage unit 181 stores two or more facial images of each person.

The control unit 190 controls each unit of the learning device 100 to perform various processes. The function of the control unit 190 is executed by a CPU (Central Processing Unit) included in the learning device 100 reading a program from the storage unit 180 and executing the program.

The triplet acquisition unit 191 randomly acquires, from the facial images stored in the training data storage unit 181, two facial images of the same person and one facial image of a person different from the person in those facial images. The combination of the three facial images acquired by the triplet acquisition unit 191 is referred to as a triplet. A combination of three facial images in which one or more of the facial images of the triplet is processed into a candidate for an adversarial example is also referred to as a triplet.

An adversarial example candidate here is a facial image with noise added to the original facial image. Since the facial recognition system 1 performs learning so that the facial image to which noise is added is less likely to act as an adversarial example, it is described as an "adversarial example candidate" rather than an "adversarial example."

Each of the facial images included in the triplet is also called an example.

The triplet acquisition unit 191 determines one of the two facial images of the same person as the anchor and the other facial image as the positive example among the acquired triplet. Further, the triplet acquisition unit 191 determines a facial image of a person different from the anchor and the positive example as a negative example. A facial image obtained by a positive example being processed into an adversarial example candidate is also referred to as a positive example. A facial image obtained by a negative example being processed into an adversarial example candidate is also referred to as a negative example.

The anchor is a facial image that serves as a reference in the learning performed by the learning unit 193. The learning unit 193 performs learning of the facial recognition model so that the difference between the feature vector of the anchor and the feature vector of the positive example becomes small and the difference between the feature vector of the anchor and the feature vector of the negative example becomes large.

The candidate acquisition unit 192 calculates an adversarial example candidate by using the slope of the difference between the feature vectors of two facial images. In particular, the candidate acquisition unit 192 acquires a candidate for a spoofing adversarial example by using facial images of different persons as the two facial images. In addition, the candidate acquisition unit 192 acquires a candidate for a recognition avoidance adversarial example by using facial images of the same person as the two facial images. The candidate acquisition unit 192 corresponds to an example of a candidate acquisition means.

The candidate acquisition unit 192 acquires a candidate for the spoofing adversarial example based on, for example, Equation (1).

[Equation 1]

$$x \leftarrow x - \beta \nabla \|f(x) - f(x^{trg})\|_2 \quad (1)$$

x indicates a facial image to be processed.

← indicates that the value on the right side is assigned to the left side. In the case of Equation (1), ← indicates that the facial image to be processed is updated to the facial image obtained on the right side. By applying Equation (1) one or more times with x as the original facial image, x is updated to a candidate for a spoofing adversarial example.

β indicates a predetermined real number constant of 0<β≤1.

∇ indicates the nabla operator. In Equation (1), ∇ indicates the derivative by x as a vector.

f indicates a function for calculating the feature vector of the image.

$x^{trg}$ indicates the target facial image. The target facial image is a facial image of a person sought to be spoofed. In Equation (1), the facial image of a person different from the target is used as the original facial image (x prior to updating).

$\|\cdot\|_2$ indicates the Euclidean distance (L2 norm).

"$\nabla \|f(x) - f(x^{trg})\|_2$" indicates the derivative of the difference between the feature vectors of the two facial images x and $x^{trg}$ by x. This corresponds to an example of the slope of the difference between the feature vectors of the two facial images.

In Equation (1), as the value of the constant β increases, a facial image closer to the target facial image $x^{trg}$ is obtained as a candidate for an adversarial example (facial image x after updating). Alternatively, when the constant β is set to a sufficiently small value, the facial image x approaches the target facial image $x^{trg}$ by repeatedly applying Equation (1) to the facial image x.

The candidate acquisition unit 192 acquires a recognition avoidance adversarial example based on, for example, Equation (2).

[Equation 2]

$$x \leftarrow x + \gamma \nabla \|f(x) - f(x^{src})\|_2 \quad (2)$$

Also in the case of Equation (2), ← indicates that the facial image to be processed is updated to the facial image obtained on the right side. By applying Equation (2) one or more times with x as the original facial image, the facial image x is updated to a candidate for a recognition avoidance adversarial example.

Also in the case of Equation (2), ∇ indicates the derivative by x as a vector.

$x^{src}$ denotes the source facial image. The source facial image is a facial image of a person who wants to avoid recognition. In Equation (2), the facial image of the same person as the source is used as the original facial image (facial image x prior to updating).

γ indicates a predetermined real number constant of 0<γ≤1. The value of γ may be set to the same value as the value of β in Equation (1), or may be set to a different value.

"$\nabla \|f(x) - f(x^{src})\|_2$" denotes the derivative of the difference between the feature vectors of the two facial images x and $x^{src}$ by x. This corresponds to an example of the slope of the difference between the feature vectors of two facial images.

In Equation (2), as the value of the constant γ increases, a facial image with a large difference from the source facial image $x^{src}$ can be obtained as a candidate for an adversarial example (x after updating). Alternatively, when the constant γ is set to a sufficiently small value, the difference of the facial image x with the source facial image $x^{src}$ becomes large by repeatedly applying Equation (2) to the facial image x.

The candidate acquisition unit 192 updates the positive example of the triplet acquired by the triplet acquisition unit 191 to the candidate for a recognition avoidance adversarial example. Further, the candidate acquisition unit 192 updates the negative example of the triplet acquired by the triplet acquisition unit 191 to the candidate for a spoofing adversarial example.

In the following, a case where the candidate acquisition unit 192 updates both the positive example and the negative example to candidates for adversarial examples will be described as an example. However, the candidate acquisition unit 192 may update only one of the positive example and the negative example to a candidate for an adversarial example.

The learning unit 193 performs learning of the facial recognition model so as to further reduce the triplet loss using the triplet in which the candidate acquisition unit 192 updates the positive example and the negative example to candidates for adversarial examples. The learning unit 193 corresponds to an example of a learning means.

Here, the anchor is also referred to as the first facial image. A facial image obtained by updating the positive example to the candidate for a recognition avoidance adversarial example is also referred to as a second facial image. A facial image obtained by updating the negative example to the candidate for a spoofing adversarial example is also referred to as a third facial image.

Accordingly, the learning unit 193 performs learning of a facial recognition model so as to further reduce a triplet loss that uses a first facial image, a second facial image that is a candidate for an adversarial example of the same person as the first facial image, and a third facial image that is a candidate for an adversarial example of a different person than the first facial image.

Moreover, the learning unit 193 performs learning using a recognition avoidance adversarial example as a second facial image. The learning unit 193 performs learning using a spoofing adversarial example as a third facial image.

Triplet loss is defined as in Equation (3) as a loss function Loss with an anchor $x_a$, a positive example $x_p$, a negative example $x_n$, and a parameter θ of the facial recognition model as arguments.

[Equation 3]

$$\mathrm{Loss}(x_a, x_p, x_n; \theta) = \max\{\|f_\theta(x_a) - f_\theta(x_p)\|_2 - \|f_\theta(x_a) - f_\theta(x_n)\|_2 + \alpha, 0\} \quad (3)$$

max indicates a function that outputs the maximum value of the arguments. In Equation (3), the function max outputs the larger of the value of "$\|f_\theta(x_a) - f_\theta(x_p)\|_2 - \|f_\theta(x_a) - f_\theta(x_n)\|_2 + \alpha$" or 0.

$f_\theta$ is a function indicating a facial recognition model. $f_\theta$ outputs a feature vector with respect to the input of the facial image. "θ" of "$f_\theta$" indicates that the output of the function $f_\theta$ depends on the value of the parameter θ.

α indicates a predetermined positive real number constant. α is also called a margin.

In Equation (3), when "$\|f_\theta(x_a)-f_\theta(x_p)\|_2-\|f_\theta(x_a)-f_\theta(x_n)\|_2+\alpha>0$", the value of "$\|f_\theta(x_a)-f_\theta(x_p)\|_2-\|f_\theta(x_a)-f_\theta(x_n)\|_2+\alpha$" becomes the value of the loss function Loss.

On the other hand, when "$\|f_\theta(x_a)-f_\theta(x_p)\|_2-\|f_\theta(x_a)-f_\theta(x_n)\|_2+\alpha\leq 0$", the value of the loss function Loss becomes 0.

Therefore, when "$\|f_\theta(x_a)-f_\theta(x_p)\|_2-\|f_\theta(x_a)-f_\theta(x_n)\|_2+\alpha\leq 0$", the value of the loss function Loss becomes a minimum.

In the case of "$\|f_\theta(x_a)-f_\theta(x_p)\|_2-\|f_\theta(x_a)-f_\theta(x_n)\|_2+\alpha\leq 0$", the distance between the feature vector of the anchor $x_a$ and the feature vector of the positive example $x_p$ is smaller than the distance between the feature vector of the anchor $x_a$ and the feature vector of the negative example $x_n$ by a margin α or more.

The learning unit 193 performs learning of a facial recognition model so that the triplet loss becomes further smaller by using the triplet in which the positive example and the negative example are updated to a candidate for an adversarial example. The learning unit 193 may solve the min-max problem shown in Equation (4) to acquire the value of the parameter θ of the facial recognition model.

[Equation 4]

$$\arg\min_\theta \left\{ \max_{\|\delta_p\|<\varepsilon_p, \|\delta_n\|<\varepsilon_n} \text{Loss}\left((x_a, x_p+\delta_p, x_n+\delta_n; \theta)\right) \right\} \quad (4)$$

$\delta_p$ indicates the noise added to the positive example $x_p$. The noise $\delta_p$ corresponds to "$+\alpha\nabla\|f(x)-f(x^{src})\|_2$" in Equation (2).

$\delta_n$ indicates the noise added to the negative example $x_n$. The noise $\delta_n$ corresponds to "$-\alpha\nabla\|f(x)-f(x^{trg})\|_2$" in Equation (1).

$\|\delta_p\|$ indicates the magnitude of noise $\delta_p$ as a vector.
$\|\delta_n\|$ indicates the magnitude of noise $\delta_n$ as a vector.

Both $\varepsilon_p$ and $\varepsilon_n$ indicate positive real constants. The value of $\varepsilon_p$ and the value of $\varepsilon_n$ may be set to the same value or may be set to different values.

In Equation (4), max outputs the maximum value of the loss function Loss ($x_a$, $x_p+\delta_p$, $x_n+\delta_n$; θ) under the conditions of $\|\delta_p\|<\varepsilon_p$ and $\|\delta_n\|<\varepsilon_n$. The candidate acquisition unit 192 calculates the value of noise $\delta_p$ and the value of noise $\delta_n$ at which the value of the loss function Loss ($x_a$, $x_p+\delta_p$, $x_n+\delta_n$; θ) becomes a maximum under the given value of θ.

argmin indicates a function that outputs a variable value that minimizes the argument value. The learning unit 193 calculates the value of the parameter θ at which the value of the loss function Loss ($x_a$, $x_p+\delta_p$, $x_n+\delta_n$; θ) becomes a maximum under the value of noise $\delta_p$ and value of noise $\delta_n$ calculated by the candidate acquisition unit 192 in the argmin calculation of Equation (4).

The learning unit 193 calculating the value of the parameter θ of the facial recognition model corresponds to learning of the facial recognition model. Further, the calculation of the value of noise $\delta_p$ and the value of noise $\delta_n$ by the candidate acquisition unit 192 corresponds to setting a candidate for an adversarial example with a high possibility of causing the facial recognition device 200 to make an error in facial recognition on the point of maximizing the value of the loss function Loss, which is a triplet loss.

It is expected that the learning unit 193 can learn a robust facial recognition model that is robust against an adversarial example by calculating the value of the parameter θ under the value of noise $\delta_p$ and the value of noise $\delta_n$ calculated by the candidate acquisition unit 192.

In this way, by learning a facial recognition model on the basis of Equation (4), the learning device 100 can perform learning in consideration of the case where an adversarial example is input to a facial recognition device.

In particular, it is expected that the learning unit 193 can learn a robust facial recognition model for a spoofing adversarial example by the candidate acquisition unit 192 calculating the value of the noise $\delta_p$ of a candidate for the spoofing adversarial example based on Equation (1). It is expected that the learning unit 193 will be able to learn a robust facial recognition model for a recognition avoidance adversarial example by the candidate acquisition unit 192 calculating the value of the noise $\delta_n$ of a candidate for the recognition avoidance adversarial example based on Equation (2).

The result was obtained through experiment that, by learning the facial recognition model using the min-max problem shown in Equation (4), the facial recognition model became relatively robust against the adversarial example.

Next, the operation of the learning device 100 will be described with reference to FIG. 3.

Figure 3:
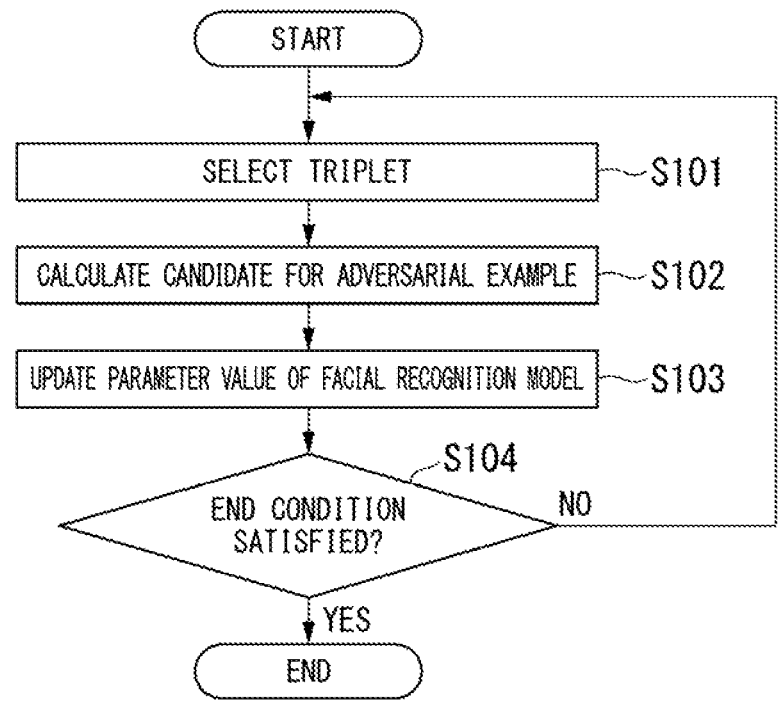
FIG. 3 is a flowchart showing an example of a processing procedure in which the learning device according to the example embodiment performs learning of a facial recognition model.

FIG. 3 is a flowchart showing an example of the processing procedure in which the learning device 100 performs learning of a facial recognition model. The learning device 100 performs the process of FIG. 3, for example, upon receiving a user operation instructing the performing learning.

(Step S101)

The triplet acquisition unit 191 selects a triplet. Specifically, the triplet acquisition unit 191 randomly acquires two facial images of the same person and one facial image of a person different form that person from facial images stored in the training data storage unit 181.

After Step S101, the process proceeds to Step S102.

(Step S102)

The candidate acquisition unit 192 calculates a candidate for an adversarial example. Specifically, the candidate acquisition unit 192 calculates the value of the noise $\delta_p$ in Equation (4) on the basis of Equation (2). The candidate acquisition unit 192 calculates the value of noise $\delta_n$ in Equation (4) on the basis of Equation (1).

In Step S102, the candidate acquisition unit 192 calculates the value of noise $\delta_p$ and the value of noise $\delta_n$ under the given value of the parameter θ. For example, the candidate acquisition unit 192 uses the default value of the parameter θ in the first execution of Step S102. The candidate acquisition unit 192 uses the latest value of the parameter θ calculated by the learning unit 193 in Step S103 in the second and subsequent executions of Step S102.

The candidate acquisition unit 192 may execute the process of Step S102 by searching for a solution by a loop.

For example, the value of the constant γ in Equation (2) is set to a relatively small value. Then, the candidate acquisition unit 192 may repeatedly update the value of the noise $\delta_p$ until the value of $\|f_\theta-(x_a)-f_\theta(x_p+\delta_p)\|_2$ changes from increase to decrease, or until $\|\delta_p\|\geq\varepsilon_p$.

Also, the value of the constant β in Eq. (1) is set to a relatively small value. Then, the candidate acquisition unit 192 may repeatedly update the value of the noise $\delta_n$ until the value of $\|f_\theta-(x_a)-f_\theta(x_n+\delta_n)\|_2$ changes from increase to decrease, or until $\|\delta_n\|\geq\varepsilon_n$.

Alternatively, the candidate acquisition unit 192 may repeat the calculation of Equation (1) and the calculation of Equation (2) a predetermined number of times.

For example, the candidate acquisition unit 192 may store the value of the noise $\delta_n$ for each operation of Equation (1) and the value of the noise $\delta_p$ for each operation of Equation (2). Then, the candidate acquisition unit 192 may select a combination of the value of noise $\delta_n$ and the value of noise $\delta_p$ that satisfies the conditions of $\|\delta_p\| < \varepsilon_p$ and $\|\delta_n\| < \varepsilon_n$, and at which the value of the loss function Loss $(x_a, x_p+\delta_p, x_n+\delta_n; \theta)$ is maximized.

After Step S102, the process proceeds to Step S103.
(Step S103)

The learning unit 193 calculates the value of the parameter of the facial recognition model using the candidate for the adversarial example calculated by the candidate acquisition unit 192 in Step S102. Specifically, the learning unit 193 calculates the value of the parameter $\theta$ at which the value of the loss function Loss $(x_a, x_p+\delta_p, x_n+\delta_n; \theta)$ is minimized under the latest candidate for an adversarial example calculated by the candidate acquisition unit 192.

After Step S103, the process proceeds to Step S104.
(Step S104)

The learning unit 193 determines whether or not a predetermined end condition is satisfied. The end condition here is not limited to a specific one. For example, as the end condition in Step S104, the end condition that the magnitude of the decrease in the value of the loss function Loss $(x_a, x_p+\delta_p, x_n+\delta_n; \theta)$ be smaller than a predetermined threshold value may be used. Alternatively, the end condition that the number of executions of the loop from steps S101 to S104 has reached a predetermined number may be used.

If the learning unit 193 has determined in Step S104 that the end condition is not satisfied (Step S104: NO), the process returns to Step S101.

On the other hand, when the learning unit 193 has determined that the end condition is satisfied (Step S104: YES), the learning device 100 ends the process of FIG. 3.

As described above, the learning unit 193 performs learning of a facial recognition model so as to further reduce a triplet loss that uses a first facial image, a second facial image that is a candidate for an adversarial example of the same person as the first facial image, and a third facial image that is a candidate for an adversarial example of a different person than the first facial image.

In this way, it is expected that the learning unit 193 can learn a facial recognition model that is robust against adversarial examples by performing learning of a facial recognition model with a triplet loss that uses an adversarial example serving as a loss function.

In this way, by the learning device 100 performing learning of a facial recognition model in which triplet loss that uses an adversarial example serves as a loss function, the learning device 100 can perform learning in consideration of the case where an adversarial example is input to a facial recognition device.

The candidate acquisition unit 192 calculates a candidate for an adversarial example by using the slope of the difference between the feature vectors of two facial images.

It is considered that the slope of the difference between the feature vectors of two facial images indicates the direction for increasing the distance between the feature vectors of the two facial images. By adding noise according to this direction to one facial image, it is expected that the distance between the feature vectors of the two facial images will increase.

Accordingly, it is expected that the candidate acquisition unit 192, by calculating a candidate for an adversarial example using the slope of the difference between the feature vectors of two facial images, can obtain a candidate for an adversarial example that easily misleads facial recognition by a facial recognition device.

The candidate acquisition unit 192 acquires a candidate for a spoofing adversarial example by using the facial images of different people as two facial images. The learning unit 193 performs learning by using a candidate for a spoofing adversarial example as a third facial image.

This is expected to allow the learning unit 193 to obtain a facial recognition model that is relatively robust against spoofing adversarial examples.

The candidate acquisition unit 192 acquires a candidate for a recognition avoidance adversarial example using facial images of the same person as two facial images. The learning unit 193 performs learning by using a candidate for a recognition avoidance adversarial example as the second facial image.

This is expected to allow the learning unit 193 to obtain a facial recognition model that is relatively robust against recognition avoidance adversarial examples.

Figure 4:
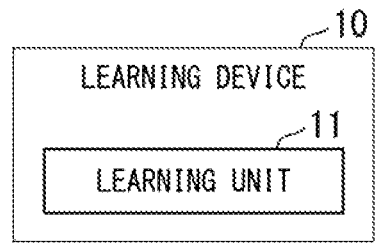
FIG. 4 is a diagram showing an example of a configuration of a learning device according to the example embodiment.

FIG. 4 is a diagram showing an example of the configuration of the learning device according to the example embodiment. The learning device 10 shown in FIG. 4 includes a learning unit 11.

With this configuration, the learning unit 11 performs learning of a facial recognition model so as to further reduce a triplet loss that uses a first facial image, a second facial image that is a candidate for an adversarial example of the same person as the first facial image, and a third facial image that is a candidate for an adversarial example of a different person than the first facial image. The learning unit 11 corresponds to an example of a learning means.

In this way, it is expected that the learning unit 193 can learn a facial recognition model that is robust against adversarial examples by performing learning of a facial recognition model with a triplet loss that uses an adversarial example serving as a loss function.

In this way, by performing learning of a facial recognition model with triplet loss that uses an adversarial example serving as a loss function, the learning device 10 can perform learning in consideration of the case where an adversarial example is input to a facial recognition device.

Figure 5:
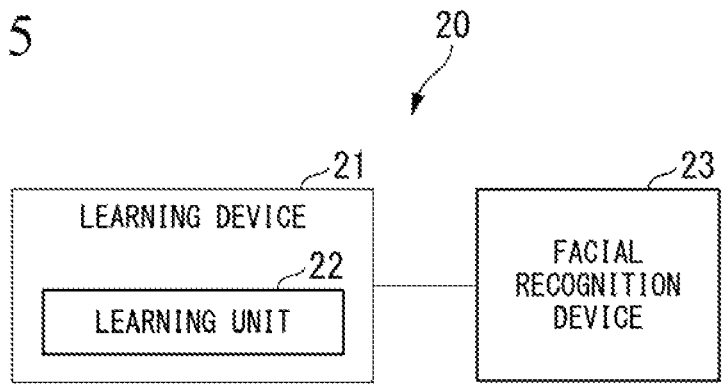
FIG. 5 is a diagram showing an example of a configuration of a facial recognition system according to the example embodiment.

FIG. 5 is a diagram showing an example of the configuration of the facial recognition system according to the example embodiment. The facial recognition system 20 shown in FIG. 5 includes a learning device 21 and a facial recognition device 23. The learning device 21 includes a learning unit 22.

With this configuration, the learning unit 21 performs learning of a facial recognition model so as to further reduce a triplet loss that uses a first facial image, a second facial image that is a candidate for an adversarial example of the same person as the first facial image, and a third facial image that is a candidate for an adversarial example of a different person than the first facial image. The learning unit 22 corresponds to an example of a learning means.

In this way, it is expected that the learning unit 22 can learn a facial recognition model that is robust against adversarial examples by performing learning of a facial recognition model with a triplet loss that uses an adversarial example serving as a loss function.

In this way, by performing learning of a facial recognition model with a triplet loss that uses an adversarial example serving as a loss function, the facial recognition system 20 can perform learning in consideration of the case where an adversarial example is input to a facial recognition device.

Figure 6:
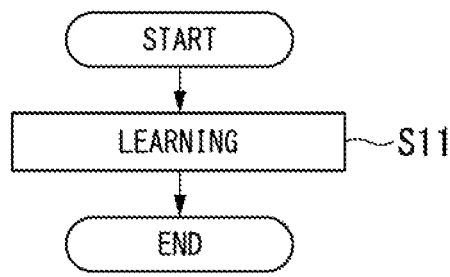
FIG. 6 is a diagram showing an example of a processing procedure in the learning method according to the example embodiment.

FIG. 6 is a diagram showing an example of a processing procedure in the learning method according to the example embodiment. The learning method shown in FIG. 6 includes a step (Step S11) of performing learning of a facial recognition model so as to further reduce a triplet loss that uses a first facial image, a second facial image that is a candidate for an adversarial example of the same person as the first facial image, and a third facial image that is a candidate for an adversarial example of a different person than the first facial image.

With this learning method, it is expected to be able to learn a facial recognition model that is robust against adversarial examples by performing learning of a facial recognition model with a triplet loss that uses an adversarial example serving as a loss function.

In this way, by performing learning of a facial recognition model with triplet loss that uses an adversarial example serving as a loss function, according to the learning method of FIG. 6, it is possible to perform learning in consideration of the case where an adversarial example is input to a facial recognition device.

Figure 7:
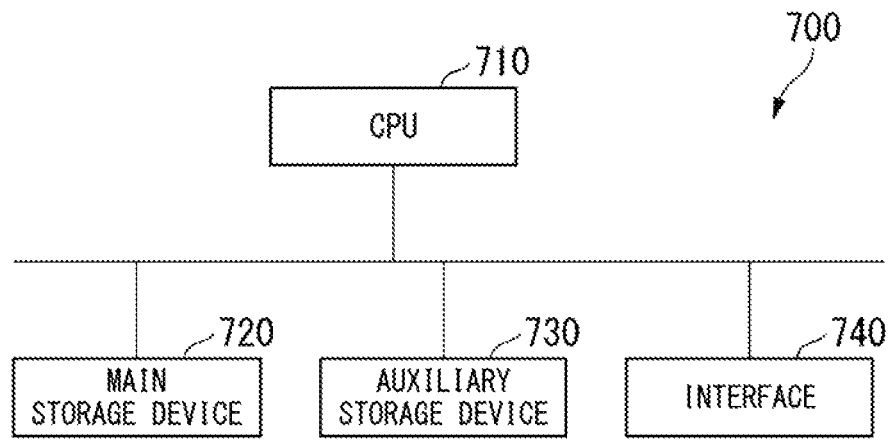
FIG. 7 is a schematic block diagram showing a configuration of a computer according to at least one example embodiment.

FIG. 7 is a schematic block diagram showing a configuration of a computer according to at least one example embodiment.

In the configuration shown in FIG. 7, the computer 700 includes a CPU 710, a main storage device 720, an auxiliary storage device 730, and an interface 740.

Any one or more of the above learning devices 10, 21 and 100 may be mounted on the computer 700. In that case, the operation of each of the above-mentioned processing units is stored in the auxiliary storage device 730 in the form of a program. The CPU 710 reads the program from the auxiliary storage device 730, deploys the program to the main storage device 720, and executes the above processing according to the program. Further, the CPU 710 secures a storage area corresponding to each of the above-mentioned storage units in the main storage device 720 according to the program. Communication between each device and other devices is executed by the interface 740 having a communication function and performing communication according to the control of the CPU 710.

When the learning device 100 is mounted on the computer 700, the operations of the control unit 190 and each unit thereof are stored in the auxiliary storage device 730 in the form of a program. The CPU 710 reads the program from the auxiliary storage device 730, deploys the program to the main storage device 720, and executes the above processing according to the program.

Further, the CPU 710 secures a storage area corresponding to the storage unit 180 in the main storage device 720 according to the program. The communication performed by the communication unit 110 is executed by the interface 740 having a communication function and performing communication according to the control of the CPU 710.

When the learning device 10 is mounted on the computer 700, the operation of the learning unit 11 is stored in the auxiliary storage device 730 in the form of a program. The CPU 710 reads the program from the auxiliary storage device 730, deploys the program to the main storage device 720, and executes the above processing according to the program.

When the learning device 21 is mounted on the computer 700, the operation of the learning unit 22 is stored in the auxiliary storage device 730 in the form of a program. The CPU 710 reads the program from the auxiliary storage device 730, deploys the program to the main storage device 720, and executes the above processing according to the program.

A program for realizing all or some of the functions of the learning devices 10, 21, and 100 may be recorded on a computer-readable recording medium, and by reading the program that is recorded on this recording medium into a computer system and executing it, the processing of each unit may be performed. Note that the "computer system" here includes an operating system and hardware such as peripheral devices.

A "computer readable recording medium" includes flexible disks, magneto-optical disks, portable media such as ROM (Read Only Memory) and CD-ROM (Compact Disc Read Only Memory), and storage devices such as hard disks built into computer systems, and the like. The above program may be for realizing some of the above-mentioned functions, and may moreover be one that can realize the aforementioned functions in combination with a program already recorded in the computer system.

Hereinabove the example embodiments of the present invention have been described in detail with reference to the drawings, but specific configurations are not limited to these example embodiments, and design changes and the like within a range not deviating from the gist of the present invention are also included.

INDUSTRIAL APPLICABILITY

The example embodiment of the present invention may be applied to a learning device, a facial recognition system, a learning method and a recording medium.

DESCRIPTION OF REFERENCE SYMBOLS 1, 20: Facial recognition system
10, 21, 100: Learning device
11, 22, 193: Learning unit
23, 200: Facial recognition device
110: Communication unit
180: Storage unit
181: Training data storage unit
190: Control unit
191: Triplet acquisition unit
192: Candidate acquisition unit

What is claimed is:
1. A learning device comprising:
at least one memory storing instructions; and
at least one processor configured to execute the instructions to:
calculate a candidate for an adversarial example of a first facial image of a person to be recognized, based on a slope of a difference between feature vectors of two facial images among the first facial image, a second facial image of the person in the first facial image, and a third facial image of a different person than the person in the first facial image;
calculate a first difference between a feature vector of the first facial image and a feature vector of the second facial image;
calculate a second difference between the feature vector of the first facial image and a feature vector of the third facial image; and
perform learning of a facial recognition model based on the calculated candidate so that the first difference becomes small and the second difference become large.
2. The learning device according to claim 1, wherein the candidate for the adversarial example is a candidate for a spoofing adversarial example, and the two facial images are the first facial image and the third facial image.

3. The learning device according to claim 1, wherein the candidate for the adversarial example is a candidate for a recognition avoidance adversarial example, and the two facial images are the first facial image and the second facial image.

4. A facial recognition system comprising:
   the learning device according to claim 1; and
   a facial recognition device comprising:
   at least one memory configured storing second instructions; and
   at least one processor configured to execute the second instructions to:
   perform facial recognition using the facial recognition model obtained in the learning.

5. A learning method performed by a computer and comprising:
   calculating a candidate for an adversarial example of a first facial image of a person to be recognized, using based on a slope of a difference between feature vectors of two facial images among the first facial image, a second facial image of the person in the first facial image, and a third facial image of a different person than the person in the first facial image;
   calculating a first difference that is a difference between a feature vector of the first facial image and a feature vector of the second facial image;
   calculating a second difference that is a difference between the feature vector of the first facial image and a feature vector of the third facial image; and
   performing learning of a facial recognition model based on the calculated candidate so that the first difference becomes small and the second difference become large.

6. A non-transitory recording medium storing a program executable by a computer to perform processing comprising:
   calculating a candidate for an adversarial example of a first facial image of a person to be recognized, using based on a slope of a difference between feature vectors of two facial images among the first facial image, a second facial image of the person in the first facial image, and a third facial image of a different person than the person in the first facial image;
   calculating a first difference that is a difference between a feature vector of the first facial image and a feature vector of the second facial image;
   calculating a second difference that is a difference between the feature vector of the first facial image and a feature vector of the third facial image; and
   performing learning of a facial recognition model based on the calculated candidate so that the first difference becomes small and the second difference become large.

* * * * *